United States Patent [19]

Heintz et al.

[11] 4,048,393
[45] July 13, 1977

[54] ALKALI METAL BATTERY STRUCTURE

[75] Inventors: Walter K. Heintz, Westland; James N. Lingscheit, Dearborn, both of Mich.

[73] Assignee: Ford Motor Company, Dearborn, Mich.

[21] Appl. No.: 720,290

[22] Filed: Sept. 3, 1976

[51] Int. Cl.² .................................................. H01M 2/02
[52] U.S. Cl. ........................................ 429/104; 429/163; 429/176
[58] Field of Search ................. 429/104, 176, 163, 31; 220/2.1 R; 206/2

[56] References Cited

U.S. PATENT DOCUMENTS

| | | | |
|---|---|---|---|
| 3,468,719 | 9/1969 | Tennenhouse | 429/191 |
| 3,833,422 | 9/1974 | Will et al. | 429/104 |
| 3,982,957 | 9/1976 | Jones et al. | 429/104 X |

*Primary Examiner*—Anthony Skapars
*Attorney, Agent, or Firm*—William E. Johnson; Keith L. Zerschling

[57] ABSTRACT

The invention is embodied in a structure for containing an alkali metal battery. A closed metal housing includes a flange having an opening therethrough. An electronically and ionically insulating ceramic member is bonded to an exterior surface of the metal housing and encircles the opening through the flange thereby to define a passageway which is an extension of the opening. An electrically insulating, cation-permeable barrier to mass liquid transfer has an interior volume and an exterior surface area. The cation-permeable barrier is bonded to the ceramic member in such a manner that the interior volume of the metal housing, the passageway defined by the ceramic member and the interior volume of the cation-permeable barrier form a first closed electrode reaction zone. A container, including a structure bonded to the ceramic member, defines a closed container which encloses the exterior surface area of the cation-permeable barrier, the volume between the interior surface area of the container and the exterior surface area of the cation-permeable barrier forming a second closed reaction zone.

3 Claims, 4 Drawing Figures

ALKALI METAL BATTERY STRUCTURE

BACKGROUND OF THE INVENTION

A recently developed type of secondary or rechargeable electrical conversion device comprises: (1) an anodic reaction zone containing a molten alkali metal anode-reactant, e.g., sodium, in electrical contact with an external circuit; (2) a cathodic reaction zone containing (a) a cathodic reactant comprising sulfur or a mixture of sulfur and molten polysulfide, which is electrochemically reversibly reactive with the anodic reactant; (b) a solid electrolyte comprising a cation-permeable barrier to mass liquid transfer interposed between and in contact with the anodic and the cathodic reaction zones; and (c) electrode devices within the cathodic reaction zone for transporting electrons to and from the vicinity of the cation-permeable barrier. As used herein the term "reactant" is intended to mean both reactants and reaction products.

During the discharge cycle of such a device, molten alkali metal atoms such as sodium surrender an electron to an external circuit and the resulting cation passes through the solid electrolyte barrier and into the liquid electrolyte to unite with polysulfide ions. The polysulfide ions are formed by charge transfer on the electrode by reaction of the cathodic reactant with the electrons conducted through the electrode from the external circuit. Because the ionic conductivity of the liquid electrolyte is less than the electronic conductivity of the electrode material, it is desirable during discharge that both electrons and sulfur be applied to and distributed along the surface of the electrode in the vicinity of the cation-permeable solid electrolyte.

During the charge cycle of such a device when a negative potential larger than the open circuit cell voltage is applied to the anode the opposite process occurs. Thus, electrons are removed from the alkali metal polysulfide by charge transfer at the surface of the electrode and are conducted through the electrode material to the external circuit, and the alkali metal cation is conducted through the liquid electrolyte and solid electrolyte to the anode where it accepts an electron from the external circuit. Because of the aforementioned relative conductivities of the ionic and electronic phases, this charging process occurs preferentially in the vicinity of the solid electrolyte and leaves behind molten elemental sulfur.

It is the principal object of this invention to provide a structure for containing an alkali metal battery in which electrical insulation is provided between the anodic and cathodic reaction zones and a secure seal is formed so that the reactants are not lost from the battery.

SUMMARY OF THE INVENTION

This invention is directed to a structure for containing an alkali metal battery and, more particularly, to a structure for containing such a battery which provides effective electrical insulation of the battery's anodic and cathodic reaction zones and a seal against loss of reactants from such zones.

In accordance with the general principles of this invention, a structure for containing an alkali metal battery includes a closed metal housing for containing an electrode reaction zone, the metal housing including a flange having an opening therethrough. A first ceramic member which is electronically and ionically insulating is bonded to a portion of the flange on an exterior surface of the metal housing and encircles the opening through the flange and extends away therefrom to define a passageway which is an extension of the opening. An electrically insulating, cation-permeable barrier to mass liquid transfer has an interior volume and an outer surface area. This cation-permeable barrier is bonded to the end of the first ceramic member remote from the metal housing, the interior volume of the metal housing, the passageway defined by the first ceramic member and the interior volume of the cation-permeable barrier forming a first closed electrode reaction zone. A container including structure bonded to the first ceramic member defines a closed container which encloses the exterior surface area of the cation-permeable barrier. A volume formed between an interior surface area of the container and the exterior surface area of the cation-permeable barrier form a second closed electrode reaction zone. The first ceramic member provides the electrical insulation between the first and second closed electrode reaction zones.

The container may be made from metal or from a ceramic material. If made from metal, the container is attached to the first ceramic member by a brazing operation in the same manner as the first ceramic member is bonded to the closed metal housing. This brazing operation provides a fluid tight seal. If the container is made from ceramic, it made be bonded to the first ceramic member by a ceramic adhesive such as glass which will provide the required seal.

DESCRIPTION OF THE PREFERRED EMBODIMENTS

The type of secondary electrical conversion batteries to which this invention relates are disclosed in the following U.S. Pat. Nos. 3,404,035; 3,404,036; 3,446,677; 3,458,356; 3,468,709; 3,468,719; 3,475,220; 3,475,223; 3,475,225; 3,535,163; 3,719,531; 3,811,493 and 3,946,751.

Figure 1:
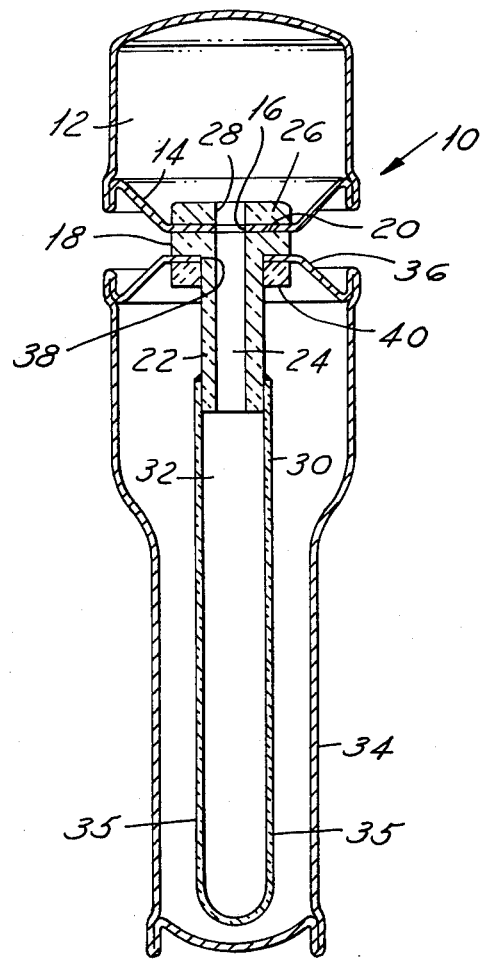
FIG. 1 is an elevational view, in cross section, of a structure for containing an alkali metal battery which is manufactured principally from metal components.
Figure 2:
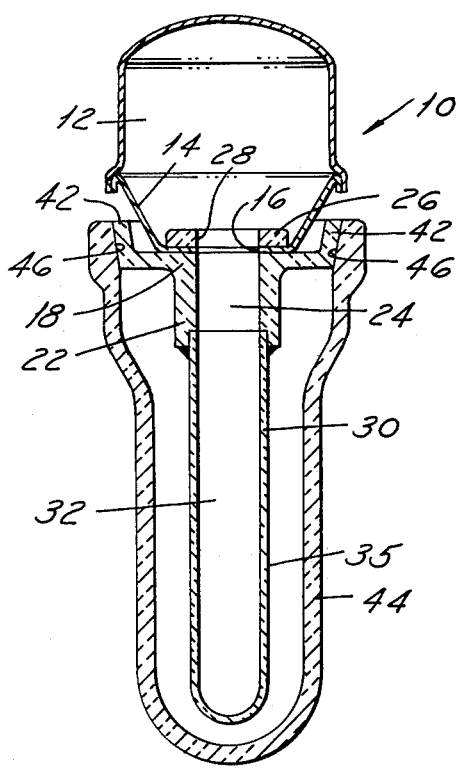
FIG. 2 is an elevational view, in cross section, of a structure for containing an alkali metal battery in which both metal and ceramic components are used.

In FIGS. 1 and 2 a structure for containing an alkali metal battery is generally identified by the numeral 10. With reference to the structure of FIG. 1, a closed metal housing 12, made from a material such as stainless steel, is shown as having a flange 14 which can be welded to an upper dome portion to form the housing. This flange has an opening 16 therein. A first electronically and ionically insulating ceramic member 18 of ring shape, made from a material such as high purity alumina, has a first surface 20 thereof brazed to an exterior surface of the housing's flange. This brazing together of the ceramic and metal is accomplished by existing brazing techniques such as active metal brazing (using alloys such as nickel-titanium eutectic compositions) or by a metallizing process followed by a filler metal brazing. The first ceramic member has an extending portion 22 which defines an extending passageway 24, which passageway is in alignment with and forms an extension of the opening 16 in the flange 14. In order to strengthen the interconnection of the housing and the first ceramic member, it is preferred that a second ceramic member 26 having an opening 28 therein be brazed to the interior surface of the flange. The ceramic members 18 and 26 are generally brazed to the flange 14 prior to the flange being welded to the upper dome portion to form the housing 12.

An electrically insulating, cation-permeable barrier 30 in the form of a closed end tube is provided. This barrier is used as a reaction zone separator and is made of a material which will permit the transfer of ions of an anodic reactant therethrough to a cathodic reactant. The barrier may have a thickness in the range of about 20 to 2000 microns and may be made of a material such as glasses and polycrystalline ceramic materials as is well known in the art. One material which is extremely useful is beta type alumina or sodium beta type alumina. The cation-permeable barrier 30 is secured to the first ceramic member 18 by a suitable glass seal.

A first reaction zone is thereby defined by the interior volume of the metal housing 12, the opening 28 in the second ceramic member 26, the opening 16 in the flange 14, the passageway 24 defined by the first ceramic member 18 and an interior volume 32 of the cation-permeable barrier 30. This reaction zone may contain an anodic reactant. The anodic reactant is heated by any conventional heating source and may be viewed as the anode proper or conductor through which electron flow to an external circuit (not shown) is achieved. Molten sodium is employed as the anodic reactant in most preferred embodiments of such alkali metal batteries. However, potassium, lithium, other alkali metals, mixtures of such alkali metals or alloys containing such alkali metals can be used.

A second metal housing 34 formed of a material such as stainless steel surrounds an exterior surface 35 of the cation-permeable barrier 30. A flange 36 of the second metal housing 34 has an opening 38 therein permitting it to be received about the extending portion 22 of the first ceramic member 18. The flange 36 may be welded at its outer edge to the rest of the can shaped structure to form the housing 34. The second metal housing is brazed to the first ceramic member 18 in the position shown. A third ceramic member 40 is brazed on the internal surface of the flange 36 in order to strengthen the connection between the second metal housing and the first ceramic member in the same manner as the second ceramic member 26 is used to strengthen the interconnection of the first ceramic member 18 and the first metal housing 12. This third ceramic member may be made of the same material as the other two ceramic members. The three ceramic members 18, 26 and 40 and the two flanges 14 and 36 may be brazed together in a single operation.

The volume between the interior surface of the second metal housing 34 and the external surface area 35 of the cation-permeable barrier forms the second reactant zone. This reactant zone can contain the cathodic reactant. The cathodic reactant of a fully charged battery is molten sulfur, which is electrochemically reversibly reactive with the anodic reactant. As the battery is discharged, the mole fraction of elemental sulfur drops until the open circuit voltage remains constant. During this portion of the discharge cycle as the mole fraction of sulfur drops from 1.0 to approximately 0.72 the cathodic reactant displays two phases, one being essentially pure sulfur and the other being sulfur saturated with alkali metal polysulfide in which the molar ratio of sulfur to alkali metal is about 5.2:2. When the battery is discharged to the point where the mole fraction of sulfur is about 0.72 the cathodic reactant becomes one phase in nature since all elemental sulfur has formed polysulfide salts. As the battery is discharged further, the cathodic reactant remains one phase in nature and as the mole fraction of sulfur drops so does the open circuit voltage corresponding to the change in the potential determining reaction. Thus, the device continues to discharge from a point where polysulfide salts contain sulfur and alkali metal in a molar ratio of approximately 5.2:2 to the point where polysulfide salts contain sulfur and alkali metal in a ratio of about 3:2. At this point the device is fully discharged.

The structure for containing an alkali metal battery as shown in FIG. 1 is one in which positive electrical insulation is made between the first metal housing 12 and the second metal housing 34 by the first ceramic member 18. The bonding of this first ceramic member to the metal housing in the brazing operation via a flange included in the seal also provides an excellent seal so that the components used in the reactant zones do not escape from the structure.

The structure for an alkali battery 10 as shown in FIG. 2 is similar functionally in many parts to the structure shown in FIG. 1. The similar parts have been numbered with the same numbers applied to FIG. 1. In this embodiment, however, the first ceramic member 18 has an outwardly extending and upwardly flared portion 42. A ceramic container 44 is provided which has an annular inwardly facing surface 46 which is bonded to a facing portion formed on the outwardly extending and upwardly flared portion 42 of the first ceramic member 18. The container for the second reaction zone is thereby defined by the volume between the interior surface of the ceramic container 44 and the exterior surface 35 of the cation-permeable barrier 30. Once again, this structure provides electrical isolation of the two reactants zones and seal of these zones so that the reactants do not escape therefrom.

Figure 3:
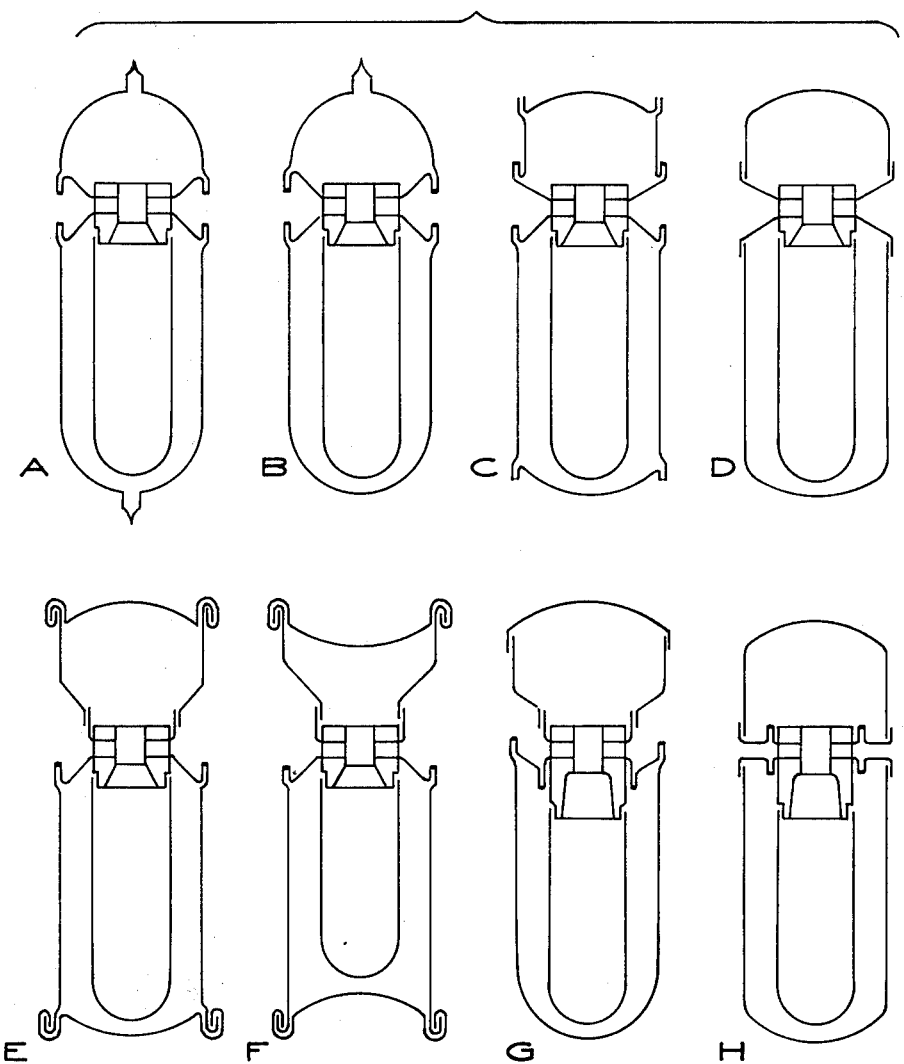
FIG. 3 is a diagrammatic illustration of a number of different ways in which alkali metal battery containers made principally from metal may be sealed.
Figure 4:
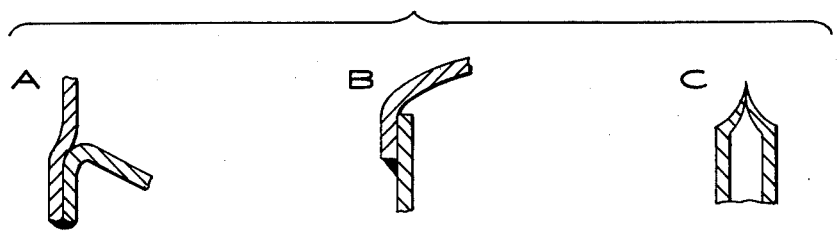
FIG. 4 is an illustration of various metal sealing techniques.

In FIG. 3 there is illustrated a plurality of manners in which a structure for containing an alkali metal battery can be fabricated with both upper and lower housings being formed of metal. The various ways of welding the metals to form a single unit are illustrated in FIG. 4. FIG. 4A is an illustration of a rim seal weld which is formed on the top of two pieces of metal after they have been brought together. FIG. 4B is a lap seam weld which is formed along one piece of metal after the two pieces of metal have been brought into an overlapping relationship. FIG. 4C is a fill tube pinch off seal which is formed when two pieces of metal are pinched together and heat and pressure applied.

FIG. 3A shows upper and lower housings having rim seal welds as well as fill tube pinch off seals which permit the closing of the housings after the reactants have been placed therein.

FIG. 3B depicts a structure similar to FIG. 3A with the exception that the fill tube pinch off seal is only shown on the upper housing.

FIG. 3C depicts a structure which can be made from cylindrical tubing with the ends of the bodies closed off by stampings. All of the welds shown are of the rim seal type.

FIG. 3D illustrates a structure in which all of the welds formed are of the lap seal type.

FIG. 3E illustrates a structure in which rim seal and lap seal welds are utilized as well as welds of the type employed in forming edges for tin cans.

FIG. 3F illustrates a structure similar to the structure of FIG. 3E with the exception that the top and bottom of the structures are concave instead of convex.

FIG. 3G illustrates the structure in which rim seals are formed on the lower container whereas lap seals are formed on the upper container.

FIG. 3H illustrates the structure in which rim seal welds and lap seal welds are used.

Having described my invention, those skilled in the art will be able to develop modifications which fall within the true spirit and scope of this invention. It is intended that all such modifications be included within the scope of the appended claims.

What we claim is:

1. A structure for containing an alkali metal battery which comprises:
    a substantially closed metal housing for containing an electrode reaction zone, said metal housing including a flange, said flange having an opening therethrough;
    a first ceramic member bonded to a portion of said flange on an exterior surface of said metal housing, said first ceramic member encircling said opening through said flange and extending away therefrom to define a passageway which is an extension of said opening;
    a cation-permeable barrier to mass liquid transfer, said barrier defining an interior volume and its outer surface defining an exterior surface area;
    means for connecting said cation-permeable barrier to said first ceramic member in such a manner that the interior volume of said metal housing, said passageway defined by said first ceramic member and said interior volume of said cation-permeable barrier form a first closed electrode reaction zone;
    container means including structure contacting said first ceramic member for defining a closed container which encloses said exterior surface area of said cation-permeable barrier, a volume between an interior surface area of said container means and said exterior surface area of said cation-permeable barrier forming a second closed electrode reaction zone.

2. A structure for containing an alkali metal battery which comprises:
    a first substantially closed metal housing for containing an electrode reaction zone, said first metal housing including a flange, said flange having an opening therethrough;
    a first ceramic member of ring shape bonded to a portion of said flange on an exterior surface of said first metal housing, said first ceramic member encircling said opening through said flange and defining a passageway which is an extension of said opening;
    a second ceramic member of ring shape bonded to a portion of said flange on an interior surface of said first metal housing, said second ceramic member encircling said opening through said flange and defining a passageway which is an extension of said opening;
    a cation-permeable barrier to mass liquid transfer, said barrier defining an interior volume and its outer surface defining an exterior surface area;
    means for connecting said cation-permeable barrier to said first ceramic member in such a manner that the interior volume of said first metal housing, said passageways defined by said first and second ceramic members and said interior volume of said cation-permeable barrier form a first closed electrode reaction zone;
    a second substantially closed metal housing bonded to said first ceramic member for containing an electrode reaction zone, said second metal housing including a flange having an opening therethrough which is larger in dimension than said opening through said flange of said first metal housing, said opening of said second metal housing encircling said portion of said first ceramic member defining said passageway which is an extension of said opening in said first metal housing; and
    a third ceramic member of ring shape bonded to a portion of said flange on an interior surface of said second metal housing,
    whereby a volume between an interior surface of said second metal housing and said exterior surface area of said cation-permeable barrier form a second closed electrode reaction zone.

3. A structure for containing an alkali metal battery which comprises:
    a substantially closed metal housing for containing an electrode reaction zone, said metal housing including a flange, said flange having an opening therethrough;
    a first ceramic member of ring shape bonded to a portion of said flange on an exterior surface of said metal housing, said first ceramic member encircling said opening through said flange and defining a passageway which is an extension of said opening;
    a second ceramic member of ring shape bonded to a portion of said flange on an interior surface of said metal housing, said second ceramic member encircling said opening through said flange and defining a passageway which is an extension of said opening;
    a cation-permeable barrier to mass liquid transfer, said barrier defining an interior volume and its outer surface defining an exterior surface area;
    means for connecting said cation-permeable barrier to said first ceramic member in such a manner that the interior of said metal housing, said passageways defined by said first and said second ceramic members and said interior volume of said cation-permeable barrier form a first closed reaction zone; and
    a ceramic container bonded to said first ceramic member and defining a closed container which encloses said exterior surface of said cation-permeable barrier, a volume defined between an interior surface area of said ceramic container and said exterior surface area of said cation-permeable barrier forming a second closed electrode reaction zone.

* * * * *